Oct. 1, 1940.    B. F. HARTWELL ET AL    2,216,439
SOLE EDGE TRIMMING CUTTER
Filed June 11, 1938
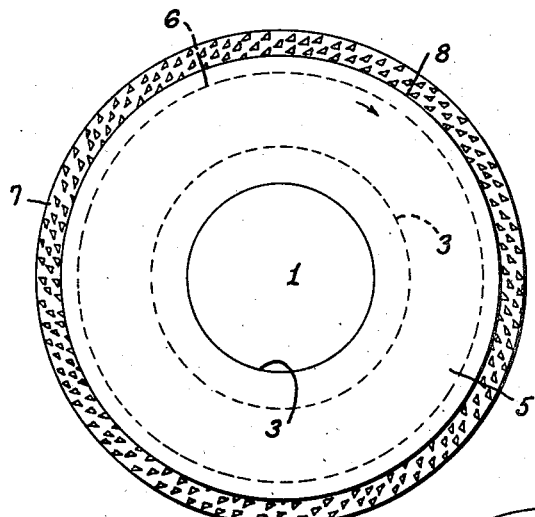
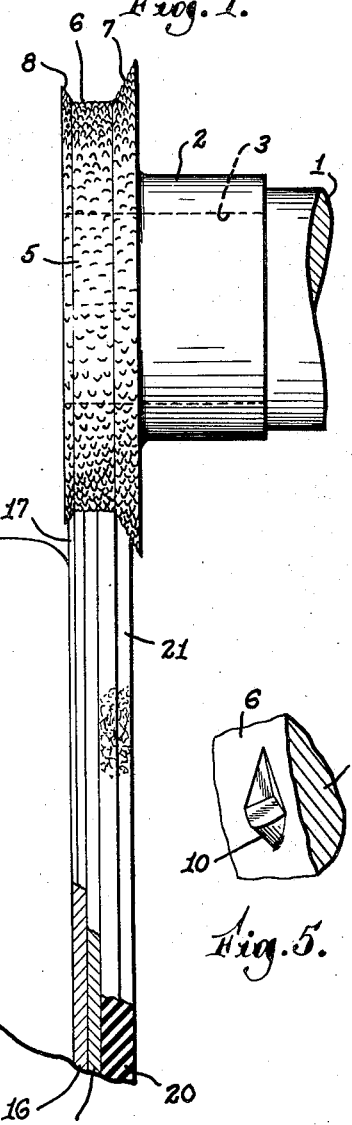
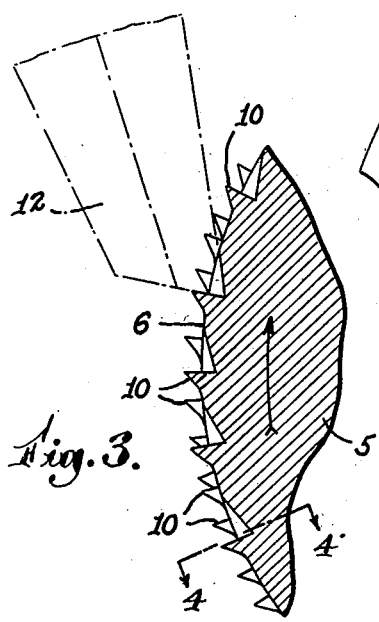
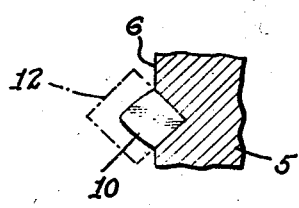
Inventors
Benjamin F. Hartwell
Leslie L. Hartwell Jr
Arthur F. Hartwell
by James R. Hodder
Attorney Patented Oct. 1, 1940

2,216,439

UNITED STATES PATENT OFFICE 2,216,439

SOLE EDGE TRIMMING CUTTER

Benjamin F. Hartwell, Leslie L. Hartwell, Jr., and Arthur F. Hartwell, Bellows Falls, Vt.

Application June 11, 1938, Serial No. 213,162

1 Claim. (Cl. 12—91)

Our present invention is a novel and improved edge trimming cutter for use in the manufacture of boots and shoes, and more particularly for trimming shoes where a rubber, fibre, or the like sole is employed.

Heretofore in the manufacture of shoes it has been customary to use rotary high-speed trimming cutters, such cutters having a plurality of teeth and operating at very high speed, such as 7000 to 8000 R. P. M. These trimming cutters when operating on boot and shoe soles, which included a rubber sole or layer and particularly where crepe rubber outsoles were employed, were found to be entirely unsatisfactory as such prior cutters, although operating on the leather sole or welt satisfactorily, did not trim the rubber sole edge in a smooth and satisfactory manner.

Many efforts have been made to remedy this difficulty but no trimming cutters prior to our present invention, as far as we are aware, have been found which would satisfactorily and efficiently trim rubber as well as leather sole edges. We have discovered that our new and novel type of trimming cutter, comprising a large number of projecting points and sharp surfaces, preferably arranged in staggered relation entirely around a rotating cutter, will trim sole edges containing rubber, latex, or any rubber compound in a smooth and highly efficient manner, as well also as trimming the leather sole edge or welt even more efficiently than the present type of trimming cutters.

In carrying out our invention we form a circular trimmer, preferably with flanged portions at each edge to bevel the top and bottom of the sole to be trimmed, of suitable metal, and form on the trimming surfaces throughout the entire area a large number of sharp staggered projections. These may be formed in any suitable manner, but we find it advisable to drive a hardened punching tool at an angle to the surface of the trimmer, viz., tangentially to the circular face of the tool. This punching action serves to force up the metal into a sharp cutting point and by staggering these punching actions entirely around the face of the trimmer, as well as that of the flange or flanges, we provide a construction of trimming machine which we find will cut, trim, and smooth any rubber or rubber compound and obviate the difficulties heretofore experienced in devices of this kind.

Furthermore, it is a simple matter to sharpen such a tool by simply again driving in the punch which forces up a new cutting edge or sharpens the old projecting surfaces by the punching action. If desired, these projections can be evened or trimmed by rotation at high speed against a grinding medium, turning the same backward so as to smooth or sharpen the punched points from the rear surface on the side opposite to that from which they have been punched up.

We further find that our improved trimmer may be rotated at less speed than that of the prior edge trimming devices and yet will produce a satisfactory cutting, trimming, and smoothing action both on the leather edge as well as the rubber sole.

This advantage of slower speed is important as eliminating the danger of injuring or burning the edge of the leather as is the case in high-speed trimmers where a careless operator may injure the sole and, hence, damage the entire shoe being trimmed.

Referring to the drawing illustrating a preferred embodiment of our present invention and showing our novel method of making same, Fig. 1 illustrates our trimmer operating upon a sole edge;

Fig. 2 is a plan view;

Fig. 3 is an enlarged fragmentary view partly in cross section showing the method of making the same;

Fig. 4 is a cross-sectional view on the line 4—4 of Fig. 3, and

Fig. 5 is a vertical view of one of the cutting projections.

Our present type of trimming and cutting device can, of course, be of any suitable width desired for the particular type of sole edge to be trimmed, it being customary to utilize cutters of varying width for this purpose, and to fit the same on a rotating shaft with suitable means to rotate the same.

We have herein illustrated a shaft 1 without however indicating the framework and driving pulley, which is of any well known standard type. Our improved type of cutter is fitted on and secured to the rotating shaft 1 and comprises a hub 2 bored to fit on the shaft 1, as shown at 3, and to be keyed or otherwise secured thereto, said hub carrying the trimming wheel 5, of somewhat larger diameter, said wheel being formed with its cutting surface 6 and top and bottom trimming flanges 7 and 8. These trimming or cutting surfaces are provided with a large number of staggered projections 10—10—10, both in the cylindrical surface 6 and in the flanges 7 and 8, as clearly shown in the drawing.

While these cutting and trimming projections 10 may be formed in any suitable manner, we prefer to make the same by our novel method of punching out the metal in the surface of the wheel 5 by a punch 12, driving the same tangentially into the surface 6 as well as that of the flanges 7 and 8 and staggering these driving punching actions so that the teeth 10 will be dispersed in an irregular manner throughout the trimming edge. Thus when the projections 10 are formed and, if desired, trimmed to an even height by rotating the trimmer opposite the direction to the arrow, as shown in Fig. 3, or contra-clockwise, the cutter is thereupon ready for use and is rotated in the direction of the arrow of Fig. 3 or clockwise. The projections 10 can be sharpened at any time by a repunching action, as will be appreciated, driving out the metal from the surface to which the punch is applied and sharpening up the edge and point of the projections 10. Thus, when the points 10 have been dulled, the entire wheel 5 can be placed in a vise and a punch 12 applied in the original recesses, as indicated in Fig. 3, and by a further punching action the metal in the dulled point 10 will be compacted and forced upwardly into a resharpened point. In addition to this repunching operation or as a separate sharpening action, the wheel 5 can be rotated in the opposite direction from that shown by the arrow in Fig. 3 and a sharpening or grinding instrument applied to the back of the points 10, which will smooth out or grind the same into resharpened condition.

As illustrated in Fig. 1, we have shown the cutter in operation in the trimming action on a boot or shoe designated at 15, having a welt 16 and sole 18 of leather, together with an outsole 20 of rubber, compound, latex, crepe leather, or the like. The flange 8 of the trimmer will cut or form the bevel 17 on the welt 16 while the lower flange 7 will form the bevel 21 on the rubber outsole 20. Our improved cutter works with equal efficiency on the leather of the welt and on the sole 18, as well as on the rubber layer 20.

Furthermore, we find that our trimmer operates with equal efficiency on any of the materials now used in the construction of boot and shoe soles, such for example as the various types of manufactured sole material, of fibre, of leather board, pulp, or textile material such as the canvas reinforcing layer, or indeed of any combinations of these materials. Also our improved cutter operates efficiently at slower speed than that heretofore customary and necessary in the rotation of the standard type of prior sole edge cutters, thus saving power, eliminating the danger of injuring and damaging the shoe, and preserving the efficiency of the trimming projections of our improved sole edge cutter.

We claim:

A sole edge trimming cutter adapted to operate upon shoe sole edges, comprising a circular member having a straight intermediate portion and two extending edge flange portions provided with a plurality of pyramidal projections positioned in staggered relation, formed in both said flange portions and in the central edge portion, whereby an edge trimming cutter of concave contour is provided.

BENJAMIN F. HARTWELL.
LESLIE L. HARTWELL, Jr.
ARTHUR F. HARTWELL.